United States Patent
Shiratsuki et al.

[11] Patent Number: 5,464,990
[45] Date of Patent: Nov. 7, 1995

[54] VOLTAGE NON-LINEAR DEVICE AND LIQUID CRYSTAL DISPLAY DEVICE INCORPORATING SAME

[75] Inventors: Yoshiyuki Shiratsuki; Yoshinori Yamaguchi; Kazuhiro Hayashi; Takahiro Niitsu, all of Ebina, Japan

[73] Assignee: Fuji Xerox Co., Ltd., Tokyo, Japan

[21] Appl. No.: 126,225

[22] Filed: Sep. 24, 1993

[30] Foreign Application Priority Data

Sep. 25, 1992 [JP] Japan .................................... 4-256340

[51] Int. Cl.[6] .............................. H01L 27/02; G02F 1/13
[52] U.S. Cl. ............................... 257/40; 257/43; 257/536; 257/537; 359/57; 359/58; 359/60; 359/79
[58] Field of Search ............................... 257/40, 43, 536, 257/537, 752, 759, 766; 359/57, 58, 60, 79

[56] References Cited

U.S. PATENT DOCUMENTS

| | | | |
|---|---|---|---|
| 4,272,754 | 6/1981 | Lou | 257/43 |
| 4,374,160 | 2/1983 | Yoshioka et al. | 427/101 |
| 5,101,288 | 3/1992 | Ohta et al. | 359/58 |
| 5,119,218 | 6/1992 | Yoshimoto et al. | 359/58 |
| 5,124,822 | 6/1992 | Becker et al. | 359/58 |
| 5,164,850 | 11/1992 | Tanaka et al. | 359/58 |

FOREIGN PATENT DOCUMENTS

| | | | |
|---|---|---|---|
| 2-96301 | 4/1990 | Japan | 359/58 |
| 2-258968 | 10/1990 | Japan | 359/58 |
| 2-291528 | 12/1990 | Japan | 359/58 |

OTHER PUBLICATIONS

"Current–voltage characteristics of ZnO–Bi2O3 heterojunction", L. F. Lou, Journal of Applied Physics 50(1):555–558 (1979).

"Varistor–Controlled Liquid–Crystal Displays", Donald E. Castleberry, IEEE Transactions On Electron Devices 26(8):1123–1128 (1979).

*Primary Examiner*—William Mintel
*Assistant Examiner*—Minhloan Tran
*Attorney, Agent, or Firm*—Finnegan, Henderson, Farabow, Garrett & Dunner

[57] ABSTRACT

A voltage non-linear device comprises, on an insulating substrate, a bottom electrode film, a voltage non-linear film, and a top electrode film formed in this order, wherein the bottom electrode film, the voltage non-linear film and the top electrode film are, respectively, made of a metal or a metal oxide formed by applying a metallo-organic paste and sintering the thus applied paste. The voltage non-linear film is made of a metal oxide sintered from a mixture of a metallo-organic zn compound and a metallo-organic compound of at least one element selected from Bi, Mn, Co, Cr and Sb. A method for making the voltage non-linear device and metallo-organic compounds useful for the method are also described. Moreover, a liquid crystal display device using the voltage non-linear device and a method for making the display device are described.

13 Claims, 9 Drawing Sheets

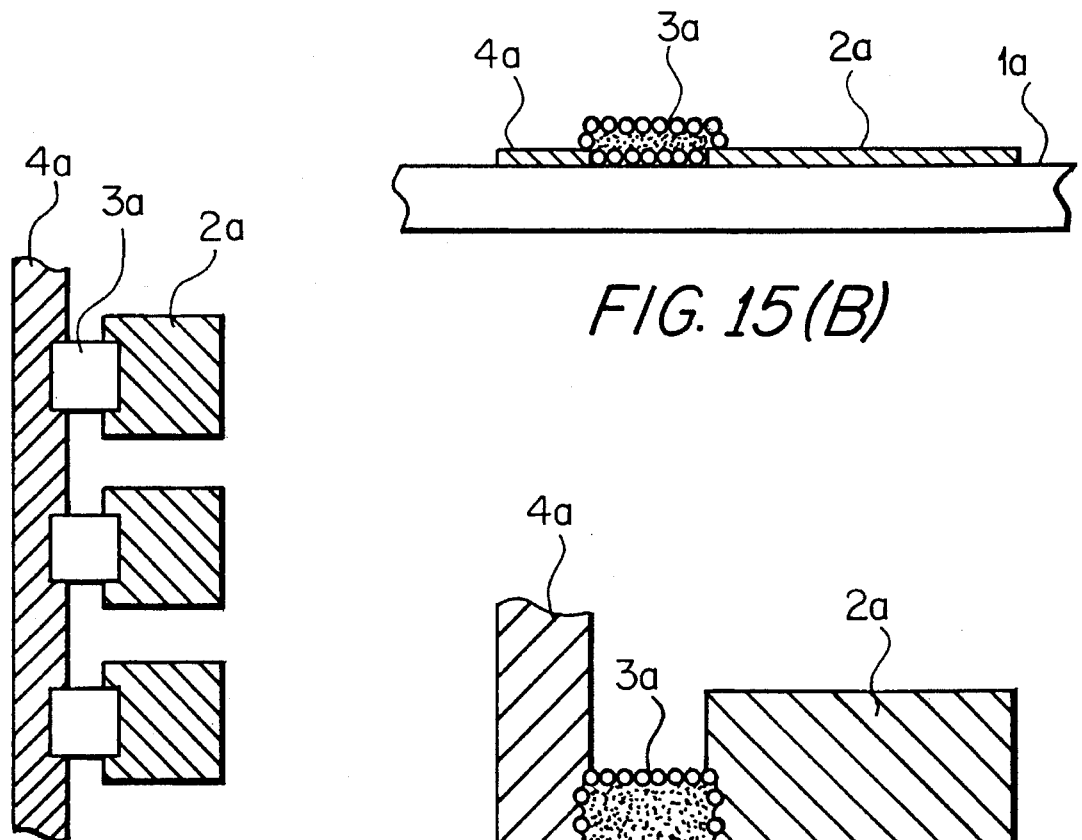
FIG. 15(B)
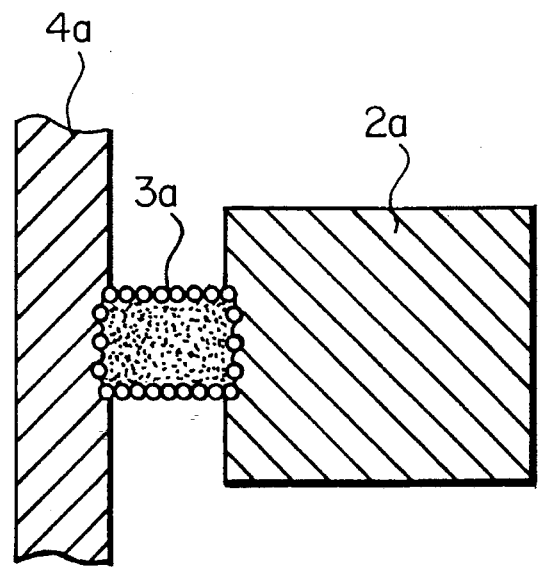
FIG. 15(A)
FIG. 15(C)

VOLTAGE NON-LINEAR DEVICE AND LIQUID CRYSTAL DISPLAY DEVICE INCORPORATING SAME

BACKGROUND OF THE INVENTION

1. Field of the Invention

This invention relates to a voltage non-linear device which has non-linear voltage-current characteristics and is thus adapted for use in surge absorption, voltage stability, overvoltage suppression or switching devices, to a method for fabricating the same and to metallo-organic pastes useful for the fabrication. The invention also to a liquid crystal display device of the active matrix type using the voltage non-linear device and to a method for fabricating the display device.

2. Description of the Related Art

A so-called varistor device is known as a voltage non-linear device which exhibits an abrupt variation in resistance relative to an applied voltage and whose voltage-current characteristic is non-linear. The resistor used in this type of voltage non-linear device generally makes use of ceramic sintered products.

The ceramic varistors are made by sintering, for example, a ZnO main ingredient with small amounts of additives such as $Bi_2O_3$, $Cr_2O_3$, $Sb_2O_3$, CoO, MnO and the like.

FIG. 12 schematically shows an arrangement of a varistor device which is a known voltage non-linear device using the sintered ceramics. In the figure, indicated at 61, 62 are electrodes, at 63 are particles each mainly composed of ZnO, at 64 is a intergranular layer, and at 65, 66 are leads for the electrodes.

As shown in the figure, the varistor device is constituted of the electrodes 61, 62 between which a layer of the semiconductor particles is provided. The semiconductor particles are obtained by sintering a primary component of ZnO with small amounts of additives such as $Bi_2O_3$, $Cr_2O_3$, $Sb_2O_3$, CoO, MnO and the like.

The varistor device makes use of the Schottky barrier which is formed by producing insulating layers such as of $Bi_2O_3$ in the intergranular layer 64 along with the growth of semiconductor ZnO crystals 63 at the time of the sintering.

A thickness of the existing voltage non-linear devices produced by ceramic sintering process is usually several millimeters. This makes it very difficult to apply it to thin-layered electronic parts and devices such as IC circuits, LCD, LED, and other panel types of displays (hereinafter referred to as display panels).

In order to ensure application of the device to the above-indicated electronic parts and devices or to realize miniaturization and formation of thin films or devices, there has been studied formation of thin or thick voltage non-linear devices.

The voltage non-linear device produced by thick film process is more reduced in the costs of fabrication apparatus than those devices produced by known ceramic sintering process, and can be miniaturized.

In this case, however, since the crystal particles are large in size, a film thickness of several tens micrometers is necessary in a minimum, disenabling one to attain the purpose of applying to IC circuits or display panels. Accordingly, it will be necessary to develop voltage non-linear devices or thin film varistor devices which are applicable to IC circuits or display panels.

A thin film voltage non-linear device is set forth, for example in Journal of Applied Physics, Vol. 50, pp. 555–558 (1979), in which ZnO and $Bi_2O_3$ layers are successively deposited on an insulating substrate with electrodes by sputtering, thereby imparting non-linear characteristics by use of the boundary between ZnO and $Bi_2O_3$.

FIG. 13 is a sectional view illustrating another structural arrangement of a thin film varistor device for use as a voltage non-linear device. In the figure, indicated at 71 is an insulating substrate, at 72 is a bottom electrode, at 73 is a ZnO semiconductor layer, at 74 is a $Bi_2O_3$ insulating layer, at 75 is a ZnO semiconductor layer, and at 76 is a top electrode.

This thin film varistor device is prepared by forming the bottom electrode 72 on the insulating substrate 71, on which the ZnO semiconductor layer 73, the $Bi_2O_3$ insulating layer 74 and the ZnO semiconductor layer 75 are deposited in this order. Finally, the top electrode 76 is formed on the layer 75.

Unlike the device produced by a ceramic sintering process, the voltage non-linear device (varistor device) of the above-described type is imparted with non-linear characteristics at the boundary between the ZnO semiconductor layers 73, 75 and the $Bi_2O_3$ insulating layer 74.

The prior art techniques relating to this type of voltage non-linear device are set forth, for example, in Japanese Laid-open Patent Application Nos. 2-258968 and 2-96301.

In recent years, liquid crystal display devices have been widely in use as a display device.

Liquid crystal display devices are fundamentally of the light-receiving type and are ones which are low in both voltage and power. The arrangement of the device is simple and can be driven with IC, so that the liquid crystal display devices can be provided as a small-size and thin display means, thus being predominantly employed in the fields of display devices such as of electronic portable calculators and wrist watches.

Moreover, as information processors such as word processors, personal computers and the like have now come into wide use, there is a requirement for such processors being portable. In order to make thin, small-size processors which satisfy the above requirement, liquid crystal display devices have now been adopted in place of currently employed CRT.

For use as display means such as of word processors and personal computers, a significantly greater number of picture elements than those for electronic portable calculators or wrist watches are necessary so as to display characters or other letters and figures. If a so-called simple matrix system having electrodes crossed in X-Y forms is used for driving, the electrodes for driving individual picture elements are not independent from one another. As a result, a given voltage is applied to adjacent picture elements, not ensuring a complete non-display condition. Thus, so-called crosstalk takes place, resulting in a lowering of display quality.

In order to overcome the crosstalk deficiency, it is necessary to provide non-linear devices, such as diodes, thin film transistors and the like, for every picture element. However, this presents the problem that it is difficult to prepare non-linear devices, such as diodes or thin film transistors, for all picture elements amounting to several thousands to several hundred thousands in number, without deficiencies as having similar characteristics over a large area.

In order to solve the problem, as set forth in IEEE TRANSACTION ON ELECTRON DEVICES, Vol. ED-26, No. 8, August, 1979, pp. 1123–1128, there has been proposed a liquid crystal device which is driven under time division by use of varistor devices.

The liquid crystal display element makes use of two insulating substrates sandwiching a liquid crystal therebetween, one of the substrates being a varistor substrate. Thus, it is not possible to make a transmission-type liquid crystal display device.

To overcome the above defect, Japanese Laid-open Patent Application No. 2-291528 proposes a structure which comprises pixel electrodes signal lines for transmitting signals to the electrodes, and varistors connected with those electrodes in a planar structure on an insulating substrate. The varistors are produced by a thick film process which comprises printing and sintering process.

The voltage non-linear device known as the varistor is generally employed as a surge absorber. As shown in the voltage-current characteristic of FIG. 11, the resistance is great at a level smaller than a certain voltage (called varistor threshold voltage, Va) under which substantially little current passes. Over the voltage Va, the resistance is abruptly reduced with current I being passed. This is true of the case using a negative voltage, −Va.

As set forth hereinbefore, such a varistor device (voltage non-linear device) makes use of the Schottky effect which is produced by sintering a $Z_nO$-based ceramics with small amounts of additives such as $Bi_2O_3$, $SiO_2$, PbO, CoO and MnO.

The varistor device can be arbitrarily controlled in varistor voltage, current capacitance and the like by controlling the distance between the electrodes and the size of particles and has been applied to various fields such as for protection of electronic circuits and of lightning rods.

However, with the known voltage non-linear device (thin film varistor device), a plurality of built-up structures consisting of the bottom electrode 72, the ZnO semiconductors 73, 75, the $Bi_2O_3$ insulating layer 74 and the top electrode 75 shown in FIG. 13 have to be formed according to a fabrication process using a vacuum apparatus. This undesirably requires a number of steps with difficulties being involved in the manner of passing a plurality of gases and the control of pressure. Thus, there arises the problem that it is difficult to keep uniform film thickness and quality over a large area. In addition, installation costs and running costs of film-forming apparatus such as a sputtering apparatus and vacuum deposition apparatus are high, with the attendant problem that the resultant thin films become high in costs.

Liquid crystal display devices using the voltage non-linear device as a driving device have the following problems.

FIG. 14 is a sectional view schematically showing a liquid crystal display device using a voltage non-linear device as a drive device. Indicated at 1a is a glass substrate, at 1b is a counter glass substrate, at 2a is a pixel electrode, at 3a is a varistor device (voltage non-linear device), at 4a is a signal line transmitting signals to the pixel electrode, at 5a is a segment electrode and at 6a is a liquid crystal.

FIG. 15a to 15c are, respectively, an illustrative view of an essential part of FIG. 14, in which FIG. 15a is a sectional view showing an electrode arrangement at the lower glass substrate, FIG. 15b is a sectional view showing one pixel at the electrode arrangement, and FIG. 15c is a plan view of one pixel electrode at the electrode arrangement.

In this liquid crystal display device, the voltage non-linear device is formed by applying a paste for thick film varistor (i.e. a paste for a thick film voltage non-linear device) according to a printing technique and sintering the applied paste. This formation process is easier and lower in cost than thin film formation techniques such as sputtering, CVD and the like, enabling one to form a great number of devices at one time over a wide area.

However, the shape in section of the varistor device 3a formed by the printing technique is a kind of protuberance, as shown in FIG. 15b, and its control in thickness is not easy. When formed by the printing technique, the resultant film has a minimum thickness of not smaller than 10 µm with a scattering of the film thickness being approximately within ±3 µm.

Accordingly, the thickness of the liquid crystal layer 6a has to be 13 µm in a minimum, thereby causing the contrast of the liquid crystal to be lowered.

When the varistor paste is subjected to screen printing, the paste is run, so that the extension from an opening of the screen at opposite sides ranges from 40 to 50 µm.

The thus formed thick film varistor 3a is unlikely to undergo fine processings such as etching. Thus, fine, precise and uniform formation in shape of the varistor 3a according to the printing technique is very difficult, thus presenting the problem that the printing technique is not suitable for application to full color liquid crystal display devices wherein the pitches of pixels are in high density.

The thick film varistor having such a planar structure as shown in FIGS. 14 and 15 is disadvantageous in that since the threshold voltage of the varistor is determined depending on the space between the electrode 2a and the signal line 4a and the particle size of the varistor paste, the threshold voltage becomes high with a great scattering, resulting in a high drive voltage of the liquid crystal display device.

SUMMARY OF THE INVENTION

Accordingly, an object of the invention is to provide a voltage non-linear device which can solve the problems of the prior art set out hereinabove and which is fabricated as having uniform film thickness and quality over a large area and is applicable to electronic parts and devices such as IC circuits and display panels.

Another object of the invention to provide a method for fabricating a voltage non-linear device inexpensively and in high productivity.

A further object of the invention to provide a metallo-organic paste which is useful for making voltage non-linear devices.

A still further object of the invention to provide an active matrix-type liquid crystal display device which comprises a voltage non-linear device as a driving device.

Another object of the invention is to provide a method for fabricating an active matrix-type liquid crystal display device using a voltage non-linear device as a driving device.

Yet another object of the invention is to provide a liquid crystal display device which is simple in fabrication process and low in costs, and is easy to form pixel electrode over a large area and which has pitches of pixel electrode in high density, is able to be driven at low voltage and is high in contrast, and a method for fabricating the same.

In the practice of the invention, a thick film formation process, i.e. a metallo-organic deposition process (abbreviated MOD process), which is feasible by inexpensive fabrication apparatus, is used wherein a metallo-organic material is thermally decomposed into a thin film consisting of a metal oxide to obtain a thin film voltage non-linear device (thin film varistor device). Using the voltage non-linear device, liquid crystal display devices are also provided. In order to achieve the above objects, the present invention have the following features as recited in the following embodiments (1) to (26).

(1) A voltage non-linear device which comprises, on an insulating substrate, a bottom electrode film, a voltage non-linear film, and a top electrode film formed in this order, wherein the bottom electrode film, the voltage non-linear film and the top electrode film are, respectively, made of a metal or a metal oxide formed by applying a metallo-organic paste and sintering the thus applied paste, and the bottom electrode film has a double-layered structure.

(2) A voltage non-linear device which comprises, on an insulating substrate, a bottom electrode film, a voltage non-linear film, and a top electrode film formed in this order, wherein the bottom electrode film has a structure consisting of a metal electrode film formed by applying a metallo-organic paste and sintering the applied paste, and a metal oxide electrode film formed by applying a metallo-organic paste and sintering the applied paste.

(3) A method for fabricating a voltage non-linear device which comprises, on an insulating substrate, a bottom electrode film, a voltage non-linear film, and a top electrode film formed in this order, the method comprising the steps of:

forming a metal electrode film on the insulating substrate by applying a metallo-organic gold or platinum paste on the insulating substrate and sintering the applied paste; and forming a metal oxide film on the metal electrode film by applying a mixed paste of metallo-organic tin and indium compounds or a mixed paste of metallo-organic zinc and aluminium compounds onto the metal electrode film and sintering the mixed paste.

(4) A voltage non-linear device which comprises, on an insulating substrate, a bottom electrode film, a voltage non-linear layer formed on the bottom electrode film and including a pair of semiconductor thin films and an insulating thin film layer provided between the paired semiconductor thin films, and a top electrode film formed on the voltage non-linear layer, wherein the bottom electrode film has a double-layered structure.

(5) A voltage non-linear device which comprises, on an insulating substrate, a bottom electrode film, a voltage non-linear layer formed on the bottom electrode film and including a pair of semiconductor thin films and an insulating thin film layer provided between the paired semiconductor thin films, and a top electrode film formed on the voltage non-linear layer, wherein the bottom electrode film consists of a metal electrode film formed by applying a metallo-organic paste and sintering the applied paste, and a metal oxide electrode film formed by applying a metallo-organic paste and sintering the applied paste.

(6) A method for fabricating a voltage non-linear device which comprises, on an insulating substrate, a bottom electrode film, a voltage non-linear layer formed on the bottom electrode film and including a pair of semiconductor thin films and an insulating thin film layer provided between the paired semiconductor thin films, and a top electrode film formed on the voltage non-linear layer, the method comprising the steps of:

forming a metal electrode film on the insulating substrate by applying a metallo-organic gold or platinum paste on the insulating substrate and sintering the applied paste; and forming a metal oxide film on the metal electrode film by applying a mixed paste of metallo-organic tin and indium compounds or a mixed paste of metallo-organic zinc and aluminium compounds onto the metal electrode film and sintering the mixed paste.

(7) A voltage non-linear device which comprises, on an insulating substrate, a bottom electrode film, a voltage non-linear layer, and a top electrode film formed in this order, wherein the voltage non-linear layer consists of a metal oxide formed by applying a mixture of a metallo-organic zinc paste and a metallo-organic paste of at least one element selected from Bi, Mn, Co, Cr and Sb, and sintering the applied paste.

(8) A voltage non-linear device which comprises, on an insulating substrate, a bottom electrode film, a voltage non-linear layer, and a top electrode film formed in this order, wherein the voltage non-linear layer consists of a metal oxide formed by applying a mixture of a metallo-organic zinc paste and a metallo-organic paste of at least one element selected from Bi, Mn, Co, Cr and Sb, the at least one element having a atomic ratio to Zn of not large than 30%, and sintering the applied paste.

(9) A method for fabricating a voltage non-linear device which comprises, on an insulating substrate, a bottom electrode film, a voltage non-linear layer, and a top electrode film formed in this order, the method comprising the steps of:

forming a bottom electrode film on the insulating substrate;

mixing a metallo-organic zinc compound and a metallo-organic compound of at least one element selected from Bi, Mn, Co, Cr and Sb to prepare a metallo-organic paste;

applying the metallo-organic paste onto the bottom electrode film;

sintering the applied metallo-organic paste to form a voltage non-linear film on the bottom electrode film; and forming a top electrode film on the voltage non-linear film.

(10) A method for fabricating a voltage non-linear device which comprises, on an insulating substrate, a bottom electrode film, a voltage non-linear layer, and a top electrode film formed in this order, the method comprising the steps of:

forming a bottom electrode film on the insulating substrate;

mixing a metallo-organic zinc compound and a metallo-organic compound of at least one element selected from Bi, Mn, Co, Cr and Sb in such a way that the at least one element is present at an atomic ratio to Zn of not larger than 30% to prepare a metallo-organic paste;

applying the metallo-organic paste onto the bottom electrode film;

sintering the applied metallo-organic paste to form a voltage non-linear film on the bottom electrode film; and forming a top electrode film on the voltage non-linear film.

(11) A metallo-organic paste which comprises a metallo-organic zinc compound, a metallo-organic compound of at least one element selected from Bi, Mn, Co, Cr and Sb, a solvent and a resin.

(12) A voltage non-linear device which has a structure comprising, on an insulating substrate, a bottom electrode film, a pair of semiconductor thin films formed on the bottom electrode and having an insulating thin film layer provided therebetween, and a top electrode film formed on the paired semiconductor thin films, wherein the paired semiconductor thin films and the insulating thin film layer are each made of a metal oxide formed by applying a metallo-organic paste and sintering the applied paste.

(13) A voltage non-linear device which has a structure comprising, on an insulating substrate, a bottom electrode film, a pair of semiconductor thin films formed on the bottom electrode and having an insulating thin film layer provided therebetween, and a top electrode film formed on the paired semiconductor thin films, wherein the paired semiconductor thin films are each made of a metal oxide formed by applying a metallo-organic paste having a Zn primary component and sintering the applied paste.

(14) A voltage non-linear device which has a structure comprising, on an insulating substrate, a bottom electrode film, a pair of semiconductor thin films formed on the bottom electrode and having an insulating thin film layer provided therebetween, and a top electrode film formed on the paired semiconductor thin films, wherein the insulating thin film layer is made of a metal oxide formed by applying a metallo-organic paste of at least one element selected from Bi, Mn, Co, Cr and Sb and sintering the applied paste.

(15) A method for fabricating a voltage non-linear device which has a structure comprising, on an insulating substrate, a bottom electrode film, a pair of semiconductor thin film layers having an insulating thin film layer provided therebetween, and a top electrode film formed in this order, the method comprising the steps of:

forming a bottom electrode film on the insulating substrate;

forming a lower semiconductor thin film layer on the bottom electrode by applying a metallo-organic paste for semiconductor thin film layer and sintering the applied paste;

forming an insulating thin film layer on the lower semiconductor thin film layer by applying a metallo-organic paste for insulating thin film layer and sintering the applied paste;

forming an upper semiconductor thin film layer on the insulating thin film layer by applying a metallo-organic paste for semiconductor thin film layer and sintering the applied paste; and forming a top electrode film on the upper semiconductor film layer.

(16) A method as set forth in (15), wherein the metallo-organic paste provided to form each of the semiconductor thin film layers comprises a metallo-organic compound whose metal consists of Zn.

(17) A method as set forth in (15), wherein the metallo-organic paste provided to form each of the semiconductor thin film layers comprises a metallo-organic compound whose metal comprises Zn as a major metal component.

(18) A method as set forth in (15), wherein the metallo-organic paste provided to form the insulating thin film layer comprises at least one metallo-organic compound whose metal is selected from Bi, Mn, Co, Cr and Sb.

(19) A liquid crystal display device which comprises a first insulating substrate including a plurality of pixel electrodes, signal lines transmitting signals to individual pixel electrodes, and voltage non-linear devices each connecting the pixel electrode and the signal line, a second insulating substrate having a segment electrode in face-to-face relation to the pixel electrodes of the first insulating substrate, and a liquid crystal filled between the first and second insulating substrates, wherein the voltage non-linear devices are each made of a metal oxide formed by applying a metallo-organic paste and sintering the applied paste.

(20) A liquid crystal display device as set forth in (19), wherein the voltage non-linear device comprises a bottom electrode film, a pair of semiconductor thin film layers having an insulating thin film layer provided therebetween, and a top electrode film form on the pair of semiconductor thin film layers.

(21) A liquid crystal display device as set forth in (20), wherein the paired semiconductor thin film layers are each made of a metal oxide formed by applying a metallo-organic paste comprising Zn as its major metal component and sintering the applied paste.

(22) A liquid crystal display device as set forth in (20), wherein the insulating thin film layer is made of a metal oxide formed by applying a metallo-organic paste of at least one element selected from Bi, Si, Pb, Mn, Co, Cr, Sb, Ti and B and sintering the applied paste.

(23) A method for fabricating a liquid crystal display device which comprises a first insulating substrate including pixel electrodes, signal lines transmitting signals to individual pixel electrodes, and voltage non-linear devices each connecting the pixel electrode and the signal line, a second insulating substrate having a segment electrode in face-to-face relation to the pixel electrodes of the first insulating substrate, and a liquid crystal filled between the first and second insulating substrates, wherein the method comprises at least a step of forming the voltage non-linear device by applying a metallo-organic paste and sintering the applied paste.

(24) A method for fabricating a liquid crystal display device which comprises a first insulating substrate including pixel electrodes, signal lines transmitting signals to individual pixel electrodes, and voltage non-linear devices each connecting the pixel electrode and the signal line, the voltage non-linear devices each comprising a bottom electrode, a pair of semiconductor thin film layers having an insulating thin film layer provided therebetween, and a top electrode film formed in this order, a second insulating substrate having a segment electrode in face-to-face relation to the pixel electrodes of the first insulating substrate, and a liquid crystal filled between the first and second insulating substrates, wherein the method comprises at least a step of forming the voltage non-linear device wherein the semiconductor thin film layers and the insulating thin film layer are, respectively, formed by applying a metallo-organic paste and sintering the applied paste.

(25) A method as set forth in (24), wherein the method comprises at least a step of forming the respective semiconductor thin film layers by applying a metallo-organic paste comprising Zn as its major metal component.

(26) A method as set forth in (24), wherein the method comprises at least a step of forming the insulating thin film layer by applying a metallo-organic paste of at least one element selected from Bi, Si, Pb, Mn, Co, Cr, Sb, Ti and B and sintering the applied paste.

The metallo-organic zinc paste may further comprises Al as its metal component.

The voltage non-linear device (thin film varistor device) fabricated according to the MOD process can be applied to IC circuits and display panels.

More particularly, the voltage non-linear device of the invention is formed by the metallo-organic deposition (MOD) process wherein metallo-organic compounds are thermally decomposed to form a voltage non-linear device composed of so-called thin film layers, unlike known thick film voltage non-linear devices wherein crystal particles are kneaded to provide a paste.

The method for fabricating a voltage non-linear device according to the invention is easier than known thin film formation processes using vacuum apparatus with respect to the control in thickness of the respective layers and the control in compositional ratio of individual elements. This ensures a very high degree of freedom in controlling characteristic properties with improved productivity. Thus, high-quality voltage non-linear devices (thin film varistor devices) can be produced at low costs.

In order to form the driving device of liquid crystal display devices, when the MOD process is used to form the semiconductor films and insulating film, the film thickness and the compositional ratios of constituent elements are more easily controlled than those of known thin film formation processes using vacuum apparatus. This results in low costs of fabrication apparatus and ensures a continuous production line since the MOD process is a normal pressure process, with high productivity.

Thus, the method for fabricating the liquid crystal display device according to the invention makes it possible to perform fine processings without a sacrifice of the advantages of the simple MOD process. Thus, there can be provided a liquid crystal display device which has pitches of pixel in high density and can be driven at low voltage with a high contrast.

BRIEF DESCRIPTION OF THE DRAWINGS

FIGS. 15a to 15c are, respectively, essential parts of the device of FIG. 14 wherein FIG. 15a shows an electrode arrangement on a glass substrate, FIG. 15b is a sectional view showing one pixel of the electrode arrangement, and FIG. 15c is a plan view of one pixel of the electrode arrangement.

PREFERRED EMBODIMENTS OF THE INVENTION

Preferred embodiments of the invention are described with reference to the accompanying drawings.

Figure 1:
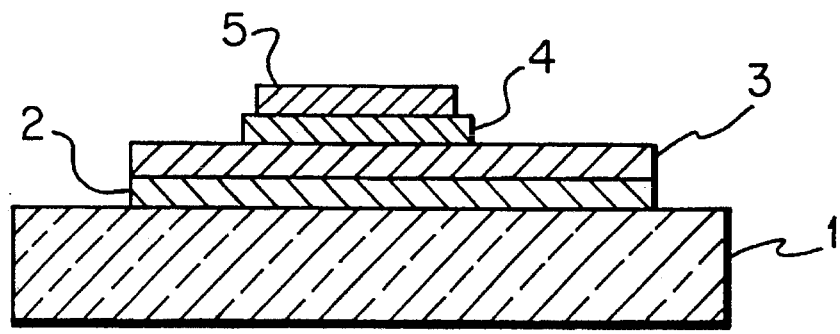
FIG. 1 is a sectional view showing a voltage non-linear device according to a first embodiment of the invention.

Reference is now made to the accompanying drawings and particularly to FIG. 1. In the figure, there is shown a voltage non-linear device according to one embodiment of the invention. The device includes an insulating glass substrate 1, and a first bottom electrode film 2, a second bottom electrode film 3, a voltage-current non-linear film 4 and a top electrode film 5 formed on the substrate 1 in this order.

The non-linear device of the figure can be fabricated in the following manner. A metallo-organic gold paste is printed on a glass substrate 1 and sintered to form a first bottom electrode film 2. Then, indium octylate and tin octylate are, for example, provided and weighed at an atomic ratio of indium (In) and tin (Sn) of 1:0.1. The mixture of indium octylate and tin octylate is further mixed with abietic acid at a mixing ratio of 10:3 to obtain a paste. The paste is printed in desired pattern on the film 2 and sintered to from the second bottom electrode film 3.

Subsequently, zinc dibenzyldithiocarbamate and bismuth octylate are weighed at an atomic ratio of Zn and Bi of 1:0.1. α-Terpineol and abietic acid are mixed with the mixture of zinc dibenzyldithiocarbamate and bismuth octylate at ratios by weight of 6:3 based on 10 of the mixture of zinc dibenzyldithiocarbamate and bismuth octylate, followed by sufficient agitation to completely dissolve zinc dibenzyldithiocarbamate to obtain a paste. The paste is printed in a desired pattern and sintered to form a voltage non-linear film 4.

Finally, a metallo-organic gold paste is printed on the film 4 and sintered to form a top electrode film 5.

When the bottom electrode is formed according to the MOD method using a metallo-organic gold paste, gold particles may be produced as projections in or on the gold film constituting the bottom electrode. This is true of the case using a metallo-organic platinum paste.

When a voltage non-linear film is formed directly on the bottom electrode film having such gold or platinum particles, the film thickness becomes thinner at the projected portions, thereby causing not only characteristic properties to be scattered, but also the breakdown strength to be lowered.

Where gold or platinum particles are produced in the film of the first bottom electrode 2, a conductive thin film made of a glass material is formed to provide a second bottom electrode film 3. Although the conductivity of the second bottom electrode film 3 is lower than that of the gold or platinum conductive film, the degree of occurrence of the projections is very low, with the projections of the first bottom electrode film being covered with the second electrode film, resulting in a flat surface. For application to the cases where the conductivity of the bottom electrode is sufficient to be low, it is not necessary to use the metal conductive film, but the voltage non-linear film may be formed directly on a conductive thin film made of glass materials. The conductive thin film made of the glass material may be composed not only of a mixture of metallo-organic indium and tin compounds, but also of a mixture of metallo-organic zinc and aluminium compounds.

Figure 2:
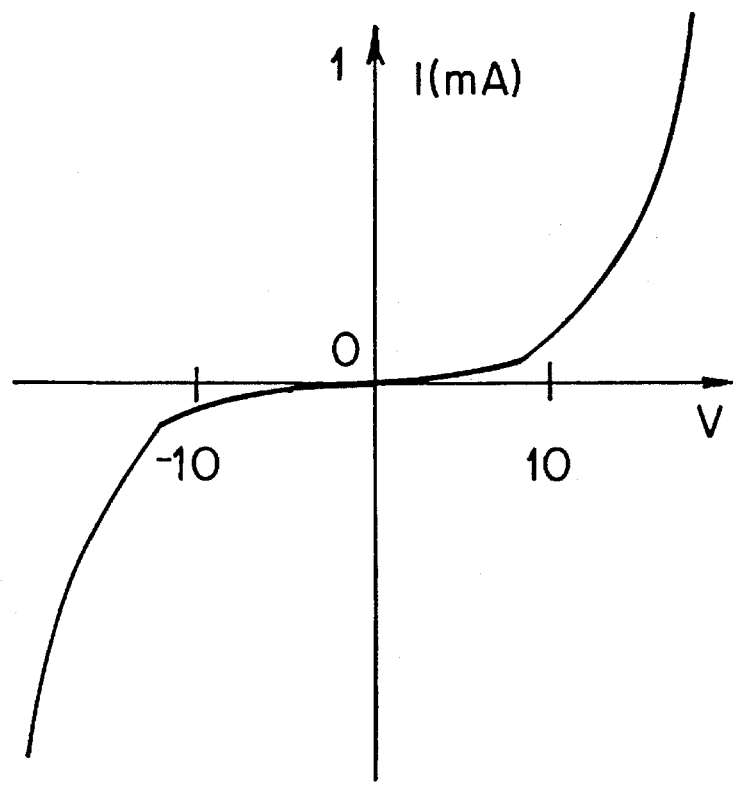
FIG. 2 is a graph showing the voltage-current characteristic of the voltage non-linear device according to the first embodiment of the invention.

FIG. 2 shows a voltage-current characteristic of the voltage non-linear device according to the invention. From the characteristic curve, it will be seen that the device has a non-linear characteristic such that when a voltage not lower than about 10 volts, a current starts to pass through the device.

Figure 3:
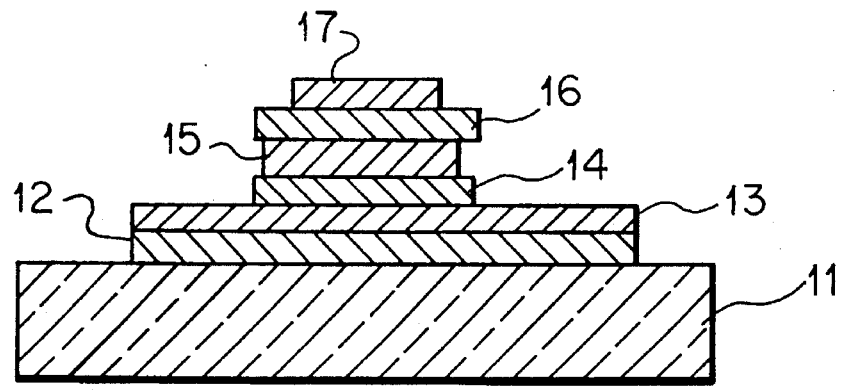
FIG. 3 is a sectional view showing a voltage non-linear device according to a second embodiment of the invention.

FIG. 3 shows a voltage non-linear device according to a second embodiment of the invention. The device includes a glass substrate 11, a first bottom electrode film 12, a second bottom electrode film 13, a first semiconductor thin film 14, an insulating thin film 15, a second semiconductor thin film 16, and a top electrode film 17 formed in this order. In this arrangement, the insulating thin film 15 is intervened between a pair of the semiconductor thin films 14 and 16.

For fabrication of the device, the glass substrate 11 is first provided, on which a metallo-organic gold paste is printed and and sintered to form the first bottom electrode 12. Then, indium octylate and tin octylate are weighed so that the atomic ratio of indium and tin is 1:0.1, and the mixture of indium octylate and tin octylate is further mixed with abietic acid at a mixing ratio by weight of 10:3, thereby providing a paste. The paste is printed on the electrode 12 and sintered to form a second bottom electrode film 13.

Subsequently, zinc dibenzyldithiocarbamate, α-terpineol and abietic acid are mixed at mixing ratios by weight of 10:6:3, followed by sufficient agitation to completely dissolve zinc dibenzyldithiocarbamate, printing on the second bottom electrode film 12 and sintering to form the semiconductor film 14 made mainly of ZnO.

Further, a mixture of bismuth octylate, α-terpineol and abietic acid at mixing ratios by weight of 1:2:1 is printed on the film 14 and sintered to form a $Bi_2O_3$ insulating layer thin film 15.

In the same manner as with the semiconductor thin film 14, the semiconductor thin film 16 made mainly of ZnO is formed on the insulating layer thin film 15.

Finally, a metallo-organic gold paste is printed as an uppermost layer and sintered to form a top electrode film 17.

Figure 4:
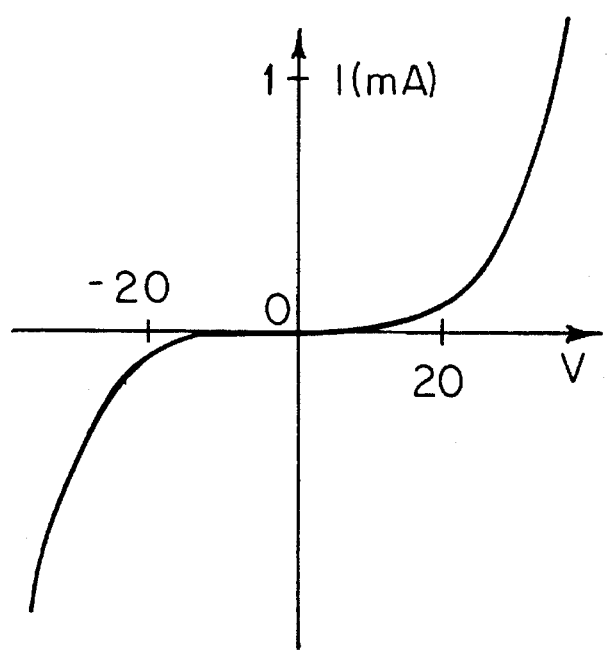
FIG. 4 is a graph showing the voltage-current characteristic of the voltage non-linear device according to the second embodiment of the invention.

FIG. 4 shows a voltage-current characteristic of the resultant voltage non-linear device according to this embodiment, revealing that when a voltage of not lower than about 20 volts is applied, a current starts to pass through the device.

The metallo-organic compounds used in the above embodiment are not critical provided that organic ligand complexes are contained therein. Specific examples of the organic ligands include carboxylic acids such as octylic acid, benzoic acid, naphthenic acid, lauric acid, stearic acid, abietic acid, caprylic acid, myristic acid, palmitic acid, linoleic acid, oleic acid and the like, β-diketones such as bisacetylacetonato compounds, carbamic acid, and the like.

The metallo-organic compounds are dissolved in solvents to provide pastes, which are applied onto a heat-resistant substrate to form a film. The solvents for this purpose include petroleum solvents, mineral spirits, turpentine oil, benzene, alcohol solvents, carbitol solvents, toluene, cellosolve solvents and the like. These solvents may be properly used depending on the type of metallo-organic compound. If a metallo-organic compound used is sparingly soluble in a solvent, ligands such as trioctylphosphine oxide (TOPO), tributyl phosphate (TBP) or amines capable of producing addition complexes may be added in suitable amounts.

The metallo-organic paste may be applied as it is. It is preferred that depending on the manner of application, thickeners or diluents are added to the paste for viscosity adjustment. Thickeners include, for example, rosins, abietic acid, cellulose, acrylic resins and the like. Diluents include, for example, α-terpineol, butyl carbitol acetate and the like.

The viscosity of the solution should preferably be in the range not higher than 1000 cps., for spin coating, and in the range of from 3000 to 50000 cps., for screen printing.

As a matter of course, if the viscosity of the solution is changed within a range which is selected depending on the manner of application, the thickness of the film obtained by one coating and sintering procedure can be arbitrarily controlled.

The substrate useful in this and other embodiments of the invention is not critical provided that it suffers little or no deformation or phase change when heated at temperatures not lower than 600° C. For instance, barium borosilicate glass substrates, quartz substrates, and alumina substrates may be used.

The paste whose viscosity has been adjusted is applied onto a substrate by screen printing or spin coating. The film of the solution of an intended metal organic compound is sintered at temperatures at which the metallo-organic compound is decomposed into an intended inorganic matter. The sintering temperature is usually in the range of from 450° C. to 600° C.

The manner of heating for the sintering is not critical provided that the heat-resistant substrate can be heated to a predetermined temperature. More particularly, a belt-type sintering furnace is preferably used.

The insulating thin film 15 may be made of, aside from $Bi_2O_3$, glass metal oxides such as of Si,Pb, Mn, Co, Cr, Sb, Ti, B or the like. Of these, metal oxides of Mn, Co, Cr and Sb are preferred. A metallo-organic solution comprising one or more of these elements may be used as a paste.

The voltage non-linear device may be reduced in size to a level of 10 micrometers by use of photolitho etching. By this, thin film varistor devices which are applicable to IC circuits and display panels can be fabricated inexpensively, like thick film devices.

In this connection, if the density is approximately 4 lines/mm, direct patterning through screen printing is possible without photolitho etching. Thus, a thin film varistor device can be made without use of any photo mask. This is advantageous in saving not only fabrication costs of the mask, but also all the costs involved in the photolitho etching process.

A further embodiment of the invention is described.

Figure 5:
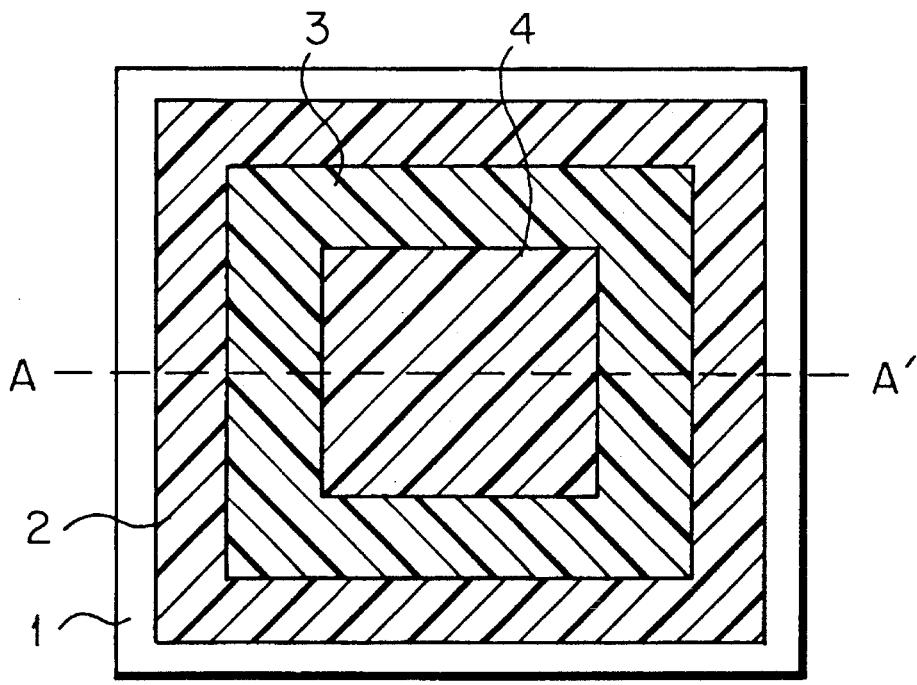
FIG. 5 is a plan view showing a voltage non-linear device serving as a thin film varistor according to a third embodiment of the invention.
Figure 6:
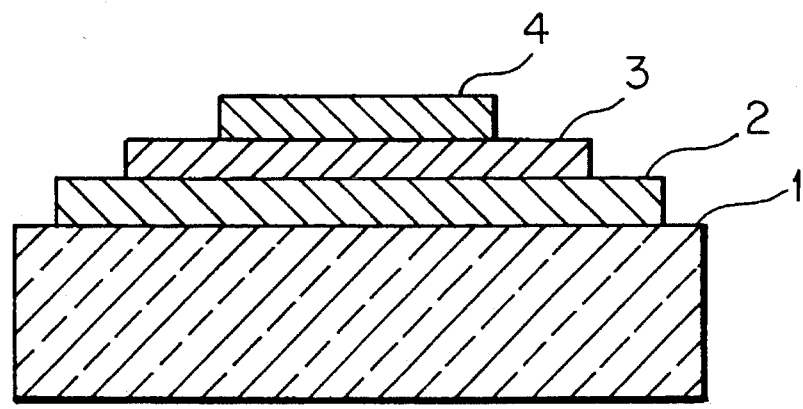
FIG. 6 is a sectional view taken along the line A—A' of FIG. 5.

FIG. 5 shows a plan view of a voltage non-linear device in the form of a thin film varistor according to a third embodiment of the invention. FIG. 6 is a sectional view taken along the line A—A' of FIG. 5. In the figures, the varistor includes a glass substrate 1, a bottom electrode film 2, a voltage non-linear film 3 and a top electrode film 4 as shown.

More particularly, the thin film varistor device includes the bottom electrode film 2 formed on the glass substrate 1 and formed of a silver film, and the voltage non-linear film 3 made mainly of Zn and formed on the film 2. The uppermost layer is the top electrode film 4 which is made of a silver film, like the bottom electrode film 2.

The voltage non-linear film 3 is characterized by a metal oxide which is formed by sintering a mixture of a metallo-organic Zn compound and a metallo-organic compound of at least one element selected from Bi, Mn, Co, Cr and Sb. The at least one element selected from Bi, Mn, Co, Cr and Sb should be contained at an atomic ratio, to Zn, of not larger than 30%. The resultant mixture is sintered to provide a mixed metal oxide.

The voltage-current characteristic of the thin film varistor device of this embodiment is similar to that shown in FIG. 2.

Figure 7:
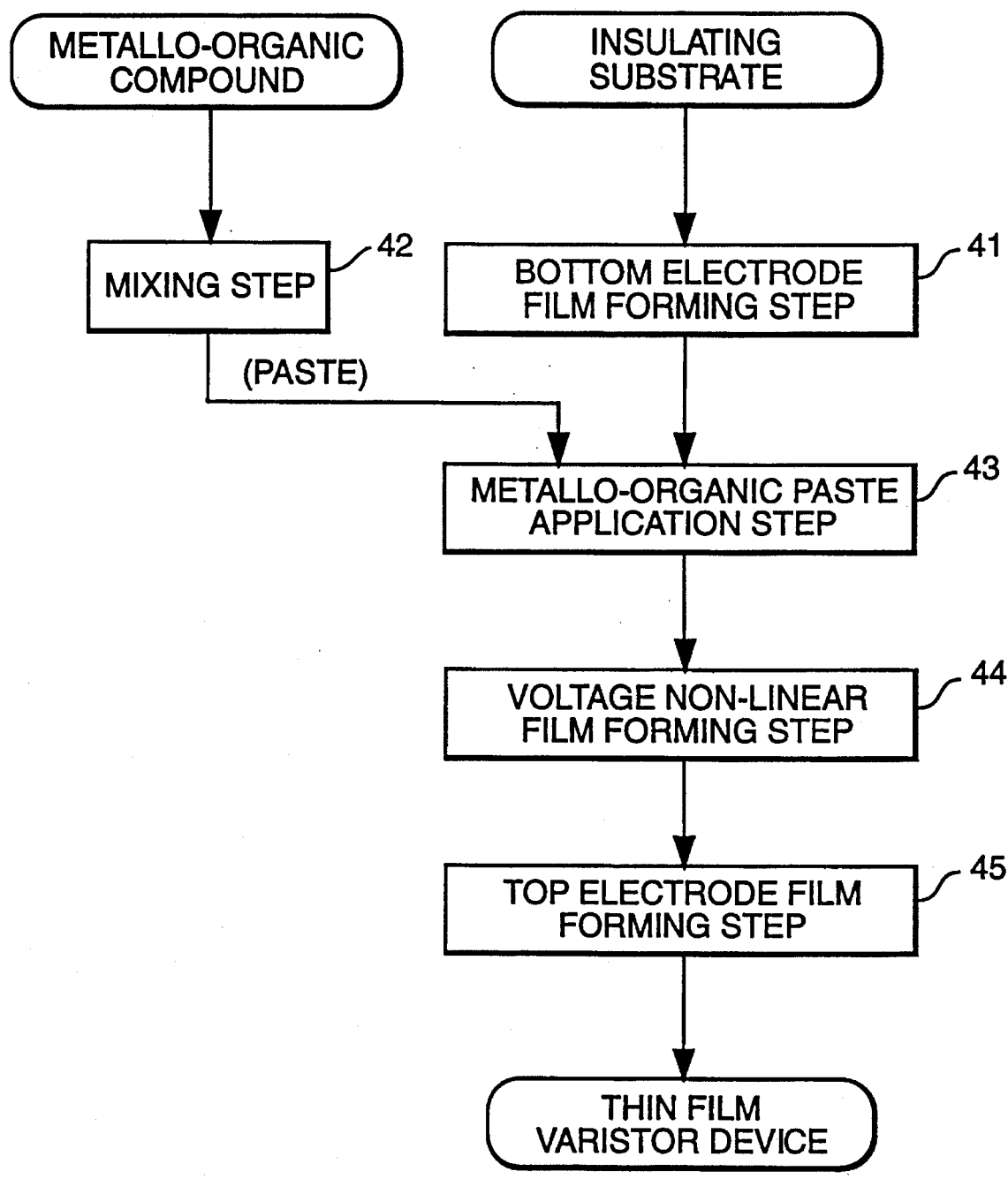
FIG. 7 is a flow chart schematically showing fabrication of a thin film varistor device according to another embodiment of the invention.

FIG. 7 is a flow chart showing fabrication of a thin film varistor device according to a further embodiment of the invention.

Bottom electrode film forming step 41

A glass substrate is provided, on which a metallo-organic silver paste is printed and sintered to form a bottom electrode film 2.

Mixing Step 42

Separately, zinc dibenzyldithiocarbamate, bismuth octylate, β-terpineol, abietic acid and trioctylphosphine oxide (TOPO) are provided as metallo-organic compounds. Zinc dibenzyldithiocarbamate and bismuth octylate are weighed such that at atomic ratio of zinc and bismuth is 1:0.1, followed by mixing with α-terpineol, abietic acid and TOPO at ratios by weight of the mixture of zinc dibenzyldithiocarbamate and bismuth octylate, α-terpineol, abietic acid and TOPO of 10:6:3:1. The mixture is sufficiently agitated until zinc dibenzyldithiocarbamate is completely dissolved to obtain a metallo-organic paste.

Metallo-organic paste coating step 43

The metallo-organic paste is subsequently applied onto the bottom electrode film 2 by screen printing or spin coating.

Voltage non-linear film forming step 44

The thus applied metallo-organic paste is sintered at a temperature of from 450° C. to 600° C. to form the voltage non-linear film 3.

Upper electrode film forming step 45

A metallo-organic silver paste is printed on the voltage non-linear film 3 and sintered to form the upper electrode 4.

Through the above-stated series of steps, there is obtained a thin film varistor device.

The metallo-organic compounds used in this embodiment are not critical provided that organic ligand complexes are present. Specific examples of the organic ligands include carboxylic acids such as octylic acid, benzoic acid, naphthenic acid, lauric acid, stearic acid, abietic acid, caprylic acid, myristic acid, palmitic acid, linolic acid, oleic acid and the like, β-diketones such as bisacetylacetonato compounds, carbamic acid, and the like.

The metallo-organic compounds are dissolved in solvents to provide pastes, which are applied onto a heat-resistant substrate such as a glass substrate to form a film. The solvents for this purpose include petroleum solvents, mineral spirits, turpentine oil, benzene, alcohol solvents, carbitol solvents, toluene, cellosolve solvents and the like. These solvents may be properly used depending on the type of metallo-organic compound.

If a metallo-organic compound used is sparingly soluble in a solvent, ligands such as trioctylphosphine oxide (TOPO), tributyl phosphate (TBP) or amines capable of producing addition complexes may be added in suitable amounts.

The metallo-organic paste may be applied as it is. It is preferred that depending on the manner of application, thickeners or diluents are added to the paste for viscosity adjustment. Thickeners include, for example, rosins, abietic acid, cellulose, acrylic resins and the like. Diluents include, for example, α-terpineol, butyl carbitol acetate and the like.

The viscosity of the solution should preferably be in the range not higher than 1000 cps., for spin coating, and in the range of from 3000 to 50000 cps., for screen printing.

As a matter of course, if the viscosity of the solution is changed within a range which is selected depending on the manner of application, the thickness of the film obtained by one coating and sintering procedure can be arbitrarily controlled.

The substrate useful in this embodiment of the invention is not critical provided that it suffers little or no deformation or phase change when heated at temperatures not lower than 600° C. For instance, barium borosilicate glass substrates, quartz substrates, and alumina substrates may be used.

The paste whose viscosity has been adjusted is applied onto an insulating substrate by screen printing or spin coating. The film of the solution of an intended metal organic compound is sintered at temperatures at which the metallo-organic compound is decomposed into an intended inorganic matter. The sintering temperature is usually in the range of from 450° C. to 600° C.

The manner of heating for the sintering is not critical provided that the heat-resistant substrate can be heated to a predetermined temperature. Although not limitative, a belt-type sintering furnace is preferably used.

The additive metal component of the metallo-organic compound may be, aside from Bi, glass metal oxides such as of Si, Pb, Mn, Co, Cr, Sb, Ti, B or the like. Of these, metal oxides of Mn, Co, Cr and Sb are preferred. A metallo-organic solution comprising one or more of these elements may be used as a paste.

The additive metal component or components influence the voltage-current characteristic shown in FIG. 3. Depending on the type and amount of additive metal component, the non-linear coefficient of the voltage-current curve is changed. Because the non-linear coefficient is made small when the amount is too small or too large. Accordingly, the amount is so controlled that the atomic ratio to Zn is in the range of 1% to 30%.

The voltage non-linear device may be reduced in size to a level of 10 micrometers by use of photolitho etching. By this, thin film varistor devices which are applicable to IC circuits and display panels can be fabricated inexpensively, like thick film devices.

In this connection, if the density is approximately 4 lines/mm, direct patterning through screen printing is possible without photolitho etching. Thus, a thin film varistor device can be made without use of any photo mask. This is advantageous in saving not only fabrication costs of the mask, but also all the costs involved in the photolitho etching process.

A still further embodiment of the invention is described.

Figure 13:
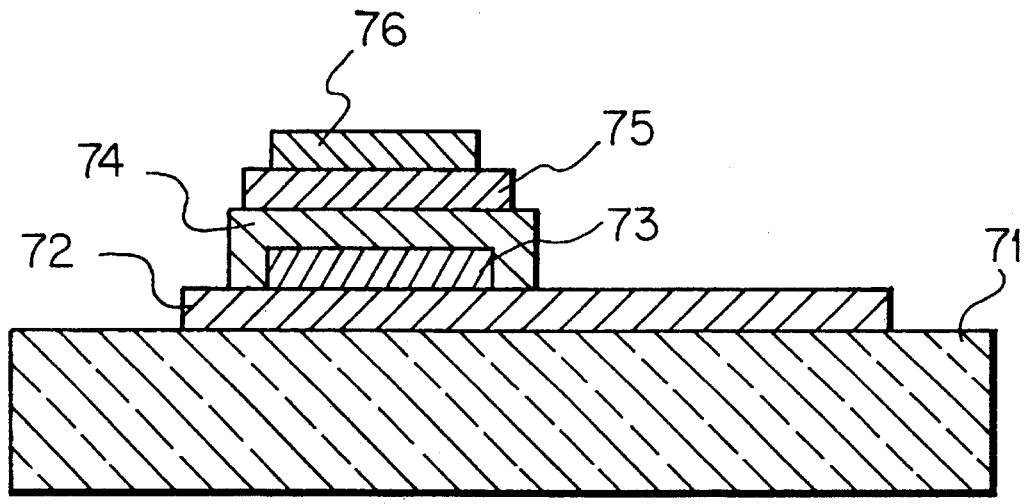
FIG. 13 is a sectional view of other structure of a known thin film varistor device as a voltage non-linear device.
Figure 14:
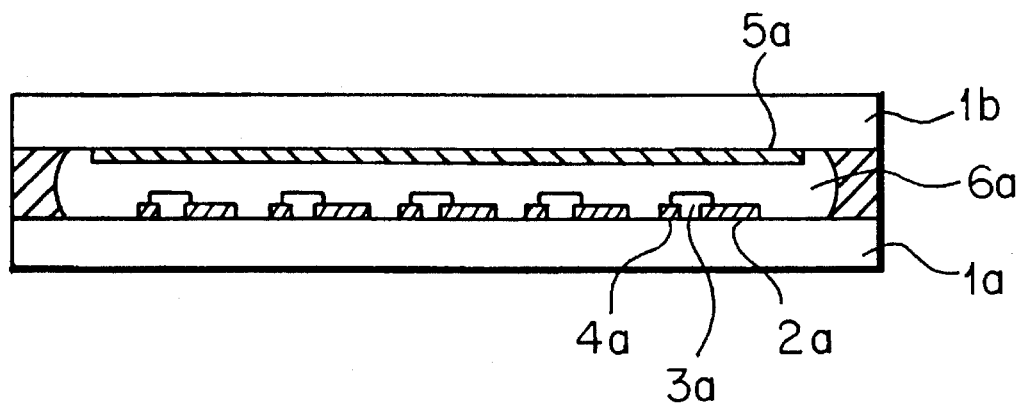
FIG. 14 is a sectional view showing a liquid crystal display device using a voltage non-linear device as a driving device.

In the following embodiment, the method of the invention is applied to a thin film varistor device of the type set forth with reference to FIG. 13 and the illustration of the structure is omitted herein.

Figure 8:
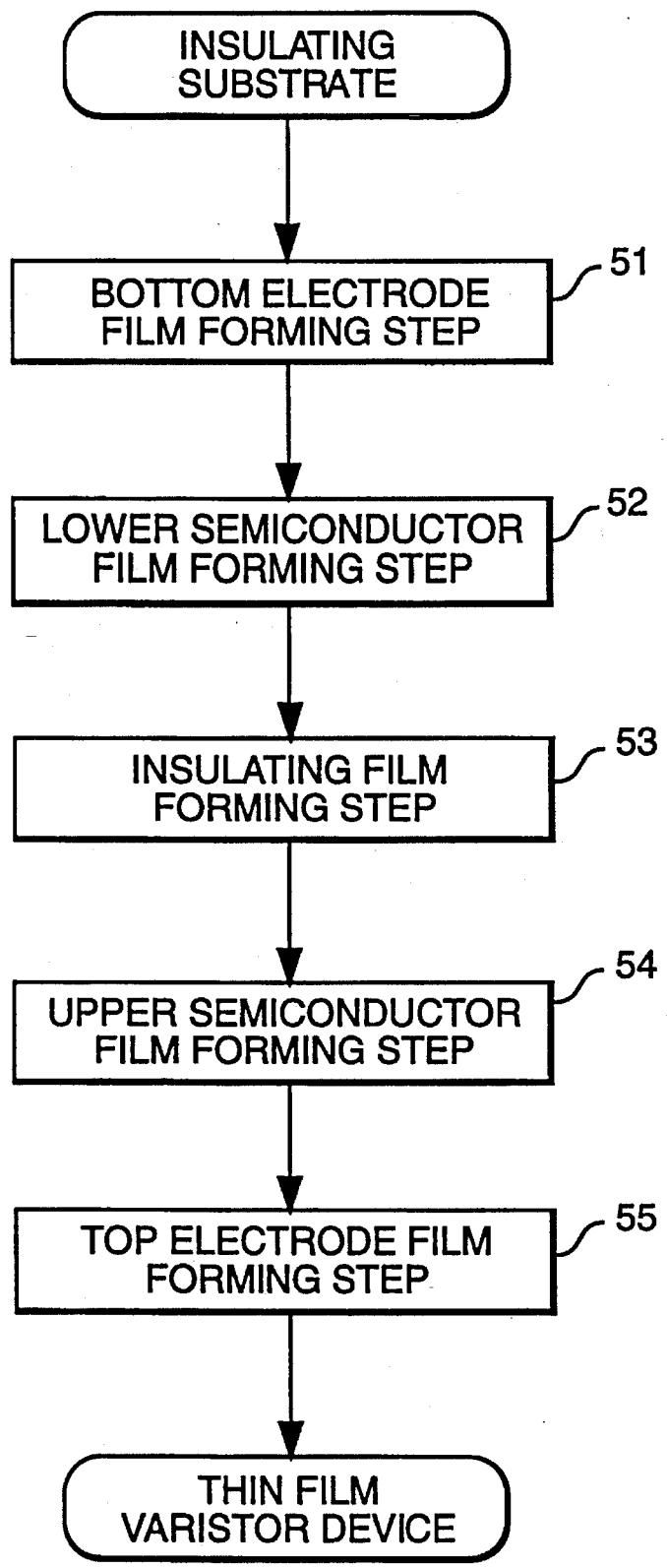
FIG. 8 is a flow chart schematically showing fabrication of a thin film varistor device according to a further embodiment of the invention.

FIG. 8 shows a flow chart for illustrating a method for fabricating a thin film varistor device according to another embodiment of the invention. This embodiment is described with reference to FIG. 13 as well. Bottom electrode film forming step 51:

A metallo-organic silver paste is printed on a glass substrate 71 and sintered, followed by photolitho etching to form a bottom electrode film 72. Lower semiconductor film forming step 52:

Zinc dibenzyldithiocarbamate, aluminium isopropoxide, α-terpineol, abietic acid and TOPO are mixed at ratios by weight of 10:0.2:6:3:1, followed by sufficient agitation to completely dissolve zinc dibenzyldithiocarbamate, printing and sintering to form a lower semiconductor film 73 mainly composed of ZnO.

Insulating film forming step 53:

Bismuth octylate, α-terpineol, abietic acid and TOPO were mixed at ratios by weight of 1:2:1:1 to obtain a metallo-organic paste. The paste is applied onto the lower semiconductor film 73 by spin coating or screen printing and sintered to form a $Bi_2O_3$ insulating thin film 74.

Upper semiconductor film forming step 54

In the same manner as in step 52, a semiconductor thin film 75 mainly composed of ZnO is formed.

Top electrode forming step 55

A metallo-organic silver paste is printed on the upper semiconductor film 75 and sintered, followed by photolitho etching to form a top electrode film 76.

Through the above-stated series of steps, a thin film varistor device is fabricated.

The voltage-current characteristic of the thin film varistor device is similar to that shown in FIG. 2.

Like the first embodiment, the voltage at which the current starts to pass in the characteristic curve of FIG. 2 is changed depending on the resistance of the semiconductor films. Thus, the resistivity is changed by changing the amount of metal component or components other than Zn, resulting in a change of the voltage. In this embodiment, Al is added but is not limitative. As a matter of course, the voltage may be changed by changing the thickness of the insulating thin film.

The metallo-organic compounds used in the above process are not critical provided that organic ligand complexes are contained therein. Specific examples of the organic ligands include carboxylic acids such as octylic acid, benzoic acid, naphthenic acid, lauric acid, stearic acid, abietic acid, caprylic acid, myristic acid, palmitic acid, linoleic acid, oleic acid and the like, β-diketones such as bisacetylacetonato compounds, carbamic acid, and the like.

The metallo-organic compounds are dissolved in solvents to provide pastes, which are applied onto a heat-resistant substrate to form a film. The solvents for this purpose include petroleum solvents, mineral spirits, turpentine oil, benzene, alcohol solvents, carbitol solvents, toluene, cellosolve solvents and the like. These solvents may be properly used depending on the type of metallo-organic compound.

If a metallo-organic compound used is sparingly soluble in a solvent, ligands such as trioctylphosphine oxide (TOPO), tributyl phosphate (TBP) or amines capable of producing addition complexes may be added in suitable amounts.

The metallo-organic paste may be applied as it is. It is preferred that depending on the manner of application, thickeners or diluents are added to the paste for viscosity adjustment. Thickeners include, for example, rosins, abietic acid, cellulose, acrylic resins and the like. Diluents include, for example, α-terpineol, butyl carbitol acetate and the like.

The viscosity of the solution should preferably be in the range not higher than 1000 cps., for spin coating, and in the range of from 3000 to 50000 cps., for screen printing.

As a matter of course, if the viscosity of the solution is changed within a range which is selected depending on the manner of application, the thickness of the film obtained by one coating and sintering procedure can be arbitrarily controlled.

The substrate useful in this embodiment of the invention is not critical provided that it suffers little or no deformation or phase change when heated at temperatures not lower than 600° C. For instance, barium borosilicate glass substrates, quartz substrates, and alumina substrates may be used depending on the purpose.

The paste whose viscosity has been adjusted is applied onto a substrate by screen printing or spin coating. The film of the solution of an intended metal organic compound is sintered at temperatures at which the metallo-organic compound is decomposed into an intended inorganic matter. The sintering temperature is usually in the range of from 450° C. to 600° C.

The manner of heating for the sintering is not critical provided that the heat-resistant substrate can be heated to a predetermined temperature. More particularly, a belt-type sintering furnace is preferably used.

The insulating thin film 74 may be made of, aside from $Bi_2O_3$, glass metal oxides such as of Si, Pb, Mn, Co, Cr, Sb, Ti, B or the like. Of these, metal oxides of Mn, Co, Cr and Sb are preferred. A metallo-organic solution comprising one or more of these elements may be used as a paste.

The thin film varistor device may be reduced in size to a level of 10 micrometers by use of photolitho etching. By this, thin film varistor devices which are applicable to IC circuits and display panels can be fabricated inexpensively, like thick film devices.

In this connection, if the density is approximately 4 lines/mm, direct patterning through screen printing is possible without photolitho etching. Thus, a thin film varistor device can be made without use of any photo mask. This is advantageous in saving not only fabrication costs of the mask, but also all the costs involved in the photolitho etching process.

Applications of the devices of the invention to liquid crystal display devices are then described.

Figure 9:
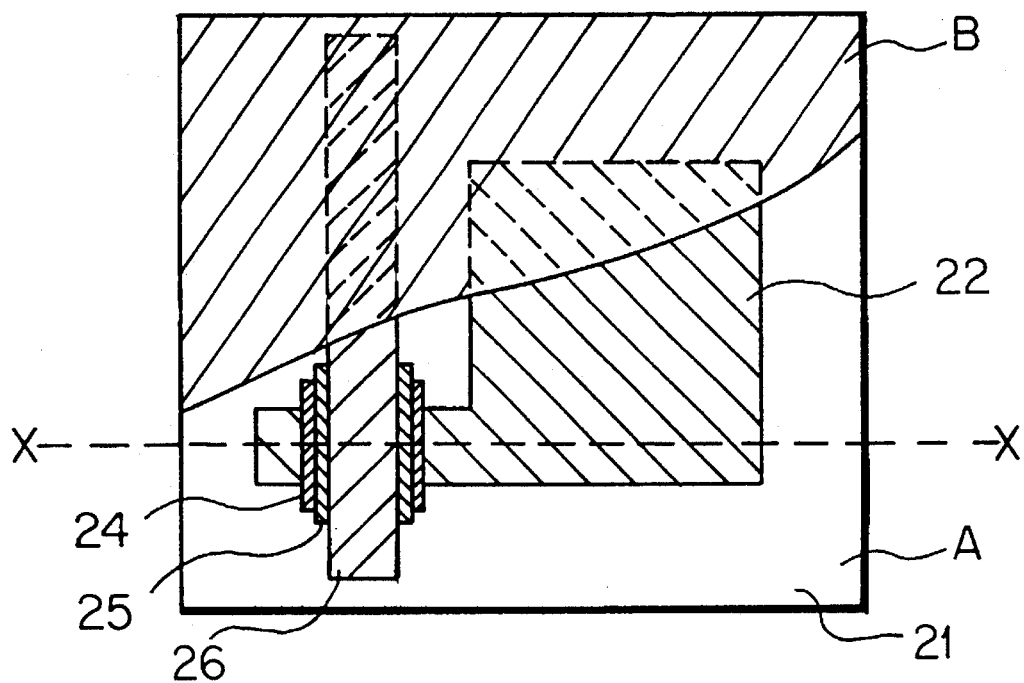
FIG. 9 is a plan view showing one pixel portion to illustrate an arrangement of a liquid crystal device according to the invention.
Figure 10:
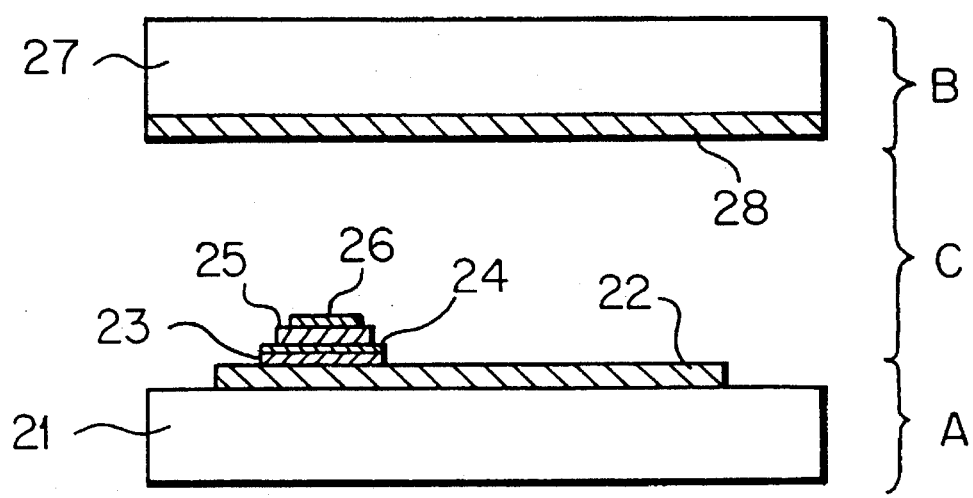
FIG. 10 is a sectional view taken along the line X—X of FIG. 9.
Figure 11:
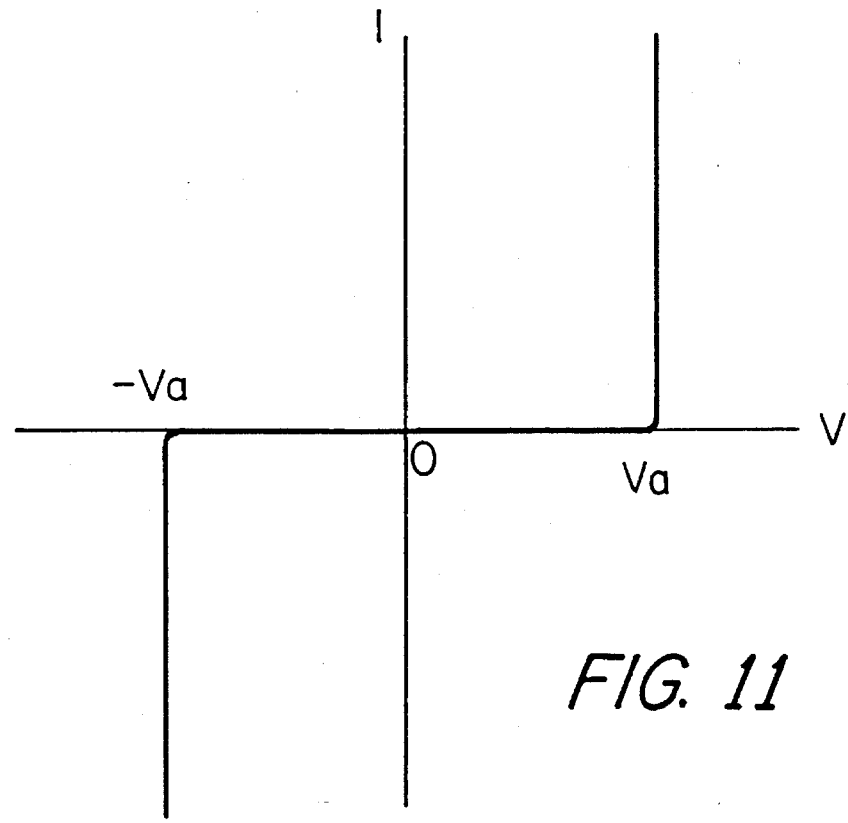
FIG. 11 is a graph illustrating a voltage-current characteristic of a voltage non-linear device.
Figure 12:
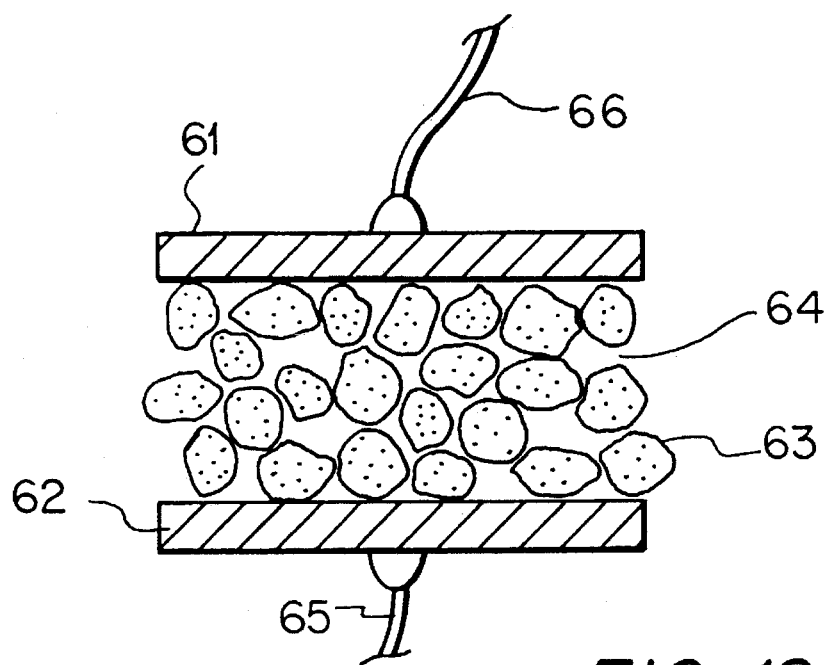
FIG. 12 is a schematic view of the structure of a varistor device serving as a voltage non-linear device produced by a known ceramic sintering process.

FIG. 9 is a pan view of one pixel portion for illustrating a liquid crystal display device according to the invention. FIG. 10 is a sectional view taken along the line X—X of FIG. 9.

In these figures, indicated at 21 is a glass substrate, at 22 is a bottom electrode film, at 23 is a first semiconductor thin film layer, at 24 is an insulating thin film, at 25 is a second semiconductor thin film layer, at 26 is a top electrode film, at 27 is a counter glass substrate, and at 28 is a transparent electrode.

The liquid crystal display device of this embodiment has a base substrate unit A which includes the glass substrate 21. There are built up, on the substrate 21, the bottom electrode film 22 made of a transparent electrode, the first semiconductor thin film layer 23 made of ZnO, the insulating thin film 24 made of $Bi_2O_3$, the second semiconductor thin film layer 25 made of ZnO, and the top electrode 26 in this order. A counter substrate unit B having the transparent electrode 28 formed on the glass substrate 27 and is arranged in face-to-face relation with the substrate unit A. A liquid crystal layer C is kept between the substrate units A and B as shown.

The liquid crystal layer C is made, for example, of liquid crystal display modes of liquid crystals including DS (dynamic scattering) mode liquid crystals, TN (twisted nematic) mode liquid crystals, ECB (electrically controlled birefringence) mode liquid crystals, GH (guest host) mode liquid crystals, STN (super twist nematic) mode liquid crystals, FLC (ferroelectric liquid crystal) mode liquid crystals and the like.

The liquid crystal display device can be fabricated according to the following procedure.

Initially, the bottom electrode 22 made of an ITO film is formed on the glass substrate 21. ITO is deposited as a film by a thin film growth technique such as an EB deposition technique, a sputtering technique, a CVD technique or the like, or by an MOD process.

The thus deposited ITO film is separated into individual pixel units according to a photolitho etching process.

The transparent electrode 28 on the counter substrate B is similarly formed.

zinc dibenzylthiocarbamate, aluminium isopropoxide, α-terpineol, abietic acid and trioctylphosphine oxide (TOPO) are mixed at ratios by weight of 10:0.2:6:3:1 and sufficiently agitated until zinc dibenzylthiocarbamate is completely dissolved, thereby obtaining a resinate paste for semiconductor thin film layer.

This resinate paste is screen printed on the bottom electrode 22, and sintered in a belt-type sintering furnace, followed by photolitho etching process to form a first semiconductor thin film layer 23 mainly composed of ZnO.

Thereafter, bismuth octylate, α-terpineol, abietic acid and TOPO are mixed at ratios by weight of 1:2:1:1 and agitated to prepare a resinate paste for insulating thin film layer.

This resinate paste is screen printed to completely cover the first semiconductor thin film layer 23 and sintered in a belt-type sintering furnace, followed by photolitho etching process to form a $Bi_2O_3$ insulating thin film layer 24.

The $Bi_2O_3$ insulating thin film layer 24 is provided to completely cover the first semiconductor thin film layer 23 therewith.

In the same manner as set forth above, a second semiconductor thin film layer 25 mainly composed of ZnO is formed on the insulating thin film layer 24 as not contact with the bottom electrode thin film layer 22. Moreover, a metallo-organic gold paste is screen printed on the layer 25 and sintered in a belt-type sintering furnace, followed by photolitho etching process to form a top electrode thin film layer 26.

Finally, there is provided a 5 μm wide space between the transparent electrode 28 of the counter substrate unit B and the base substrate unit A, into which a liquid crystal is charged to form a liquid crystal layer C.

The voltage non-linear device formed on the base substrate of the liquid crystal display device according to this embodiment has such a characteristic as shown in FIG. 4. Accordingly, when a voltage of not larger than about 20 volts is applied, a current starts to pass through the device. The voltage at which the current starts to pass depends on the resistivities of the semiconductor thin film layers 23, 25. The resistivity can be changed by changing the amount of metal components other than Zn. In this embodiment, Al is added but is not limited thereto.

The metallo-organic compounds used in the above process are not critical provided that organic ligand complexes are contained therein. Specific examples of the organic ligands include carboxylic acids such as octylic acid, benzoic acid, naphthenic acid, lauric acid, stearic acid, abietic acid, caprylic acid, myristic acid, palmitic acid, linoleic acid, oleic acid and the like, β-diketones such as bisacetylacetonato compounds, carbamic acid, and the like.

The metallo-organic compounds are dissolved in solvents to provide pastes, which are applied onto a heat-resistant substrate to form a film. The solvents for this purpose include petroleum solvents, mineral spirits, turpentine oil, benzene, alcohol solvents, carbitol solvents, toluene, cellosolve solvents and the like. These solvents may be properly used depending on the type of metallo-organic compound.

if a metallo-organic compound used is sparingly soluble in a solvent, ligands such as trioctylphosphine oxide (TOPO), tributyl phosphate (TBP) or amines capable of producing addition complexes may be added in suitable amounts.

The metallo-organic paste may be applied as it is. It is preferred that depending on the manner of application, thickeners or diluents are added to the paste for viscosity adjustment. Thickeners include, for example, rosins, abietic acid, cellulose, acrylic resins and the like. Diluents include, for example, α-terpineol, butyl carbitol acetate and the like.

The viscosity of the solution should preferably be in the range not higher than 1000 cps., for spin coating, and in the range of from 3000 to 50000 cps., for screen printing.

As a matter of course, if the viscosity of the solution is changed within a range which is selected depending on the manner of application, the thickness of the film obtained by one coating and sintering procedure can be arbitrarily controlled.

The substrate useful in this embodiment of the invention is not critical provided that it suffers little or no deformation or phase change when heated at temperatures not lower than 600° C. For instance, barium borosilicate glass substrates, quartz substrates, and alumina substrates may be used depending on the purpose.

The paste whose viscosity has been adjusted is applied onto a substrate by screen printing or spin coating. The film of the solution of an intended metal organic compound is sintered at temperatures at which the metallo-organic compound is decomposed into an intended inorganic matter. The sintering temperature is usually in the range of from 450° C. to 600° C.

The manner of heating for the sintering is not critical provided that the heat-resistant substrate can be heated to a predetermined temperature. More particularly, a belt-type sintering furnace is preferably used.

The insulating thin film 74 may be made of, aside from $Bi_2O_3$, glass metal oxides such as of Si, Pb, Mn, Co, Cr, Sb, Ti, B or the like. Of these, metal oxides of Mn, Co, Cr and Sb are preferred. A metallo-organic solution comprising one or more of these elements may be used as a paste.

The thin film varistor device may be reduced in size to a level of 10 micrometers by use of photolitho etching. By this, thin film varistor devices which are applicable to IC circuits and display panels can be fabricated inexpensively, like thick film devices.

In this connection, if the density is approximately 4 lines/mm, direct patterning through screen printing is possible without photolitho etching. Thus, a thin film varistor device can be made without use of any photo mask. This is advantageous in saving not only fabrication costs of the mask, but also all the costs involved in the photolitho etching process.

As set out hereinbefore, the voltage non-linear devices (thin film varistor devices) of the invention are applicable to IC circuits, display panels and the like. Fabrication of the devices does not necessitate complicated, large-scale and expensive vacuum apparatus which have been usually employed in thin film growth techniques such as vacuum deposition techniques, sputtering techniques, CVD techniques and the like. On the contrary, the devices can be fabricated using simple operations and apparatus using existing thick film techniques. In addition, since the device can be fabricated by normal pressure procedures, a continuous fabrication process is possible with high productivity and a significant reduction in production costs. Thus, the thin film varistor devices with good quality, their fabrication method and metallo-organic pastes used for the method can be provided while solving the problems of the prior art counterparts.

The voltage non-linear device (thin film varistor device) obtained according to the method of the invention has an electrode structure which includes a metal conductive thin film having great conductivity and a glass metal oxide conductive thin film formed on the metal conductive thin film. Accordingly, the electrode is substantially free of adverse influences of projections of the metal conductive thin film, thereby keeping a great conductivity of the electrode.

The liquid crystal display device and its fabrication method according to the invention make use of a voltage non-linear device in the form of thin films as a driving unit. Thus, fine processing through photolitho etching is possible. This ensures a precise shape of the device and a uniform film thickness with degrees of scatterings of the shape and thickness being very small. Thus, it is possible to make high density pitches of picture elements of the liquid crystal display device and a liquid crystal display device with a high contrast.

Since the thickness of the voltage non-linear device is readily controlled and thus, the so-called varistor threshold voltage can be set at a given level, there can be obtained a liquid crystal device which can be driven at low voltage.

In the method for fabricating the liquid crystal display device according to the invention, printing techniques are used to form a voltage non-linear device. The formation method is simpler and more inexpensive than known thin film formation techniques such as sputtering, CVD and the like. The printing process is a normal temperature process and is continuously feasible, bringing about high productivity. In addition, a number of voltage non-linear devices can be formed over a wide area, so that the characteristics are reduced in amount of scattering. This leads to a liquid crystal display device with good picture quality.

What is claimed is:

1. A voltage non-linear device comprising:

an insulating substrate, a bottom electrode film formed on the insulating substrate, a voltage non-linear film formed on the bottom electrode film, and a top electrode film formed on the voltage non-linear film, wherein said bottom electrode film, said voltage non-linear film and said top electrode film are made of at least one of a metal and a metal oxide formed by applying a metallo-organic paste and sintering the thus applied paste, and wherein said bottom electrode film has a double-layered structure comprising an upper layer and a lower layer, the upper layer being formed of material which depresses formation of projections on a surface facing the voltage non-linear film during formation of the bottom electrode film.

2. A voltage non-linear device according to claim 1, wherein said voltage non-linear film comprises a sintered mixture of a metallo-organic zinc paste and a metallo-organic paste of at least one element selected from Bi, Mn, Co, Cr and Sb.

3. A voltage non-linear device according to claim 1, wherein said voltage non-linear film comprises a sintered mixture of a metallo-organic zinc paste and a metallo-organic paste of at least one element selected from Bi, Mn, Co, Cr and Sb, the at least one element having an atomic ratio to Zn no larger than 30%.

4. A voltage non-linear device according to claim 1, wherein the voltage non-linear film comprises a pair of semiconductor thin films formed on said bottom electrode; and an insulating thin film layer provided between the pair of semiconductor thin films, and wherein the pair of semiconductor thin films and said insulating thin film layer each comprises sintered metallo-organic paste.

5. A voltage non-linear device according to claim 1, wherein the voltage non-linear film comprises a pair of semiconductor thin films formed on the bottom electrode; and an insulating thin film layer provided between the pair of semiconductor thin films, and wherein the pair of semiconductor thin films each comprises sintered metallo-organic paste having a Zn primary component.

6. A voltage non-linear device according to claim 1, wherein the voltage non-linear film comprises a pair of semiconductor thin films formed on the bottom electrode; and an insulating thin film layer provided between the pair of semiconductor thin films, and wherein said insulating thin film layer comprises sintered metallo-organic paste of at least one element selected from Bi, Mn, Co, Cr and Sb.

7. A voltage non-linear device which comprises, on an insulating substrate, a bottom electrode, a voltage non-linear film, and a top electrode film formed in this order, wherein said bottom electrode has a structure comprising a metal electrode film formed by applying a metallo-organic paste and sintering the applied paste, and a metal oxide electrode film formed by applying a metallo-organic paste and sintering the applied paste.

8. A voltage non-linear device comprising:

an insulating substrate, a bottom electrode film formed on the insulating substrate, a voltage non-linear layer formed on the bottom electrode film and including a pair of semiconductor thin films and an insulating thin film layer provided between the paired semiconductor thin films, and a top electrode film formed on the voltage non-linear layer, wherein said bottom electrode film has a double-layered structure comprising an upper layer and a lower layer, the upper layer being formed of material which depresses formation of projections on a surface facing the voltage non-linear film during formation of the bottom electrode film.

9. A voltage non-linear device which comprises, on an insulating substrate, a bottom electrode, a voltage non-linear layer formed on the bottom electrode and including a pair of semiconductor thin films and an insulating thin film layer provided between the paired semiconductor thin films, and a top electrode film formed on the voltage non-linear layer, wherein said bottom electrode comprises a metal electrode film formed by applying a metallo-organic paste and sintering the applied paste, and a metal oxide electrode film formed by applying a metallo-organic paste and sintering the applied paste.

10. A liquid crystal display device comprising:

a first insulating substrate including a plurality of pixel electrodes, signal lines transmitting signals to individual pixel electrodes, and voltage non-linear devices each connecting the pixel electrode and the signal line; a second insulating substrate having a segment electrode in face-to-face relation to the pixel electrodes of said first insulating substrate; and a liquid crystal filled between the first and second insulating substrates, and wherein said voltage non-linear devices each comprises:

a bottom electrode film formed on said first insulating substrate;

a voltage non-linear film formed on the bottom electrode film; and a top electrode film formed on the voltage non-linear film, wherein said bottom electrode film, said voltage non-linear film and said top electrode film are made of at least one of a metal and a metal oxide formed by applying a metallo-organic paste and sintering the thus applied paste, wherein said bottom electrode film has a double-layered structure comprising an upper layer and a lower layer, the upper layer being formed of material which depresses formation of projections on a surface facing the voltage non-linear film during formation of the bottom electrode film.

11. A liquid crystal display device according to claim 10, wherein said voltage non-linear film comprises a pair of semiconductor thin film having an insulating thin film provided therebetween.

12. A liquid crystal display device according to claim 11, wherein the pair of semiconductor thin films are each made of a metal oxide formed by applying a metallo-organic paste comprising Zn as its major metal component and sintering the applied paste.

13. A liquid crystal display device according to claim 11, wherein said insulating thin film made of a metal oxide formed by applying a metallo-organic paste of at least one element selected from Bi, Si, Pb, Mn, Co, Cr, Sb, Ti and B and sintering the applied paste.

* * * * *

UNITED STATES PATENT AND TRADEMARK OFFICE
CERTIFICATE OF CORRECTION

PATENT NO.   :   5,464,990
DATED        :   November 07, 1995
INVENTOR(S)  :   Yoshiyuki SHIRATSUKI et al It is certified that error appears in the above-indentified patent and that said Letters Patent is hereby corrected as shown below:

Title page, Column 1, Line 3 of "Inventors",
"Takahiro Niitsu" should read --Takehiro Niitsu--.

Claim 11, Column 22, Line 13, "film" (first occurrence) should read --films--.

Abstract, Line 9, "zn" should read --Zn--.

Signed and Sealed this

Sixth Day of August, 1996

Attest:

BRUCE LEHMAN

Attesting Officer          Commissioner of Patents and Trademarks